(12) United States Patent
Peters et al.

(10) Patent No.: US 10,927,840 B2
(45) Date of Patent: Feb. 23, 2021

(54) PUMP DEVICE

(71) Applicant: Schwäbische Hüttenwerke Automotive GmbH, Aalen-Wasseralfingen (DE)

(72) Inventors: Sven Peters, Bad Schussenried (DE); Roman Ickert, Aulendorf (DE); Emin Ahmeti, Rindenmoos (DE)

(73) Assignee: Schwäbische Hüttenwerke Automotive GmbH, Aalen-Wasseralfingen (DE)

( * ) Notice: Subject to any disclaimer, the term of this patent is extended or adjusted under 35 U.S.C. 154(b) by 177 days.

(21) Appl. No.: 16/188,345

(22) Filed: Nov. 13, 2018

(65) Prior Publication Data

US 2019/0145417 A1  May 16, 2019

(30) Foreign Application Priority Data

Nov. 14, 2017  (DE) .......................... 102017126750.6

(51) Int. Cl.
*F04D 25/16* (2006.01)
*F04C 15/06* (2006.01)
(Continued)

(52) U.S. Cl.
CPC ............. *F04D 25/16* (2013.01); *B01D 35/26* (2013.01); *F01C 21/10* (2013.01); *F04B 39/16* (2013.01);
(Continued)

(58) Field of Classification Search
CPC .......... F04D 25/16; F04D 13/12; F04C 15/06; F04C 21/10; F04C 13/005; F04B 23/06;
(Continued)

(56) References Cited

U.S. PATENT DOCUMENTS

| | | | |
|---|---|---|---|
| 4,469,594 A  * | 9/1984 | Poetter | |
| 4,478,562 A  * | 10/1984 | Schippers | ............... B60T 17/02 137/624.13 |
| 2013/0022485 A1* | 1/2013 | Hunter | |
| 2014/0161645 A1* | 6/2014 | Bohner | ................... F04C 2/356 417/364 |

(Continued)

FOREIGN PATENT DOCUMENTS

| | | |
|---|---|---|
| CN | 1114389 A | 1/1996 |
| DE | 3340382 A1 | 5/1984 |
| DE | 4122433 C2 | 3/1994 |
| DE | 102008026193 A1 | 12/2008 |
| DE | 102014216520 A1 | 2/2016 |
| EP | 2743506 A2 | 6/2014 |

(Continued)

OTHER PUBLICATIONS

Chinese Office Action for Chinese Application No. 201811354730. 6, dated Feb. 3, 2020, with translation, 17 pages.

(Continued)

*Primary Examiner* — Atif H Chaudry
(74) *Attorney, Agent, or Firm* — RatnerPrestia

(57) ABSTRACT

A pump device for a motor vehicle, includes a pump device housing; a delivery chamber which is formed in the pump device housing and/or at least partially by the pump device housing and which includes an inlet and an outlet; a delivery structure which is arranged in the delivery chamber and delivers a fluid from the inlet on a low-pressure side of the pump device to the outlet on a high-pressure side of the pump device; a first conduit which channels the fluid from the outlet out of the delivery chamber to a first assembly; wherein a second conduit diverges from the first conduit in the region before the first assembly and feeds a portion of the pressurised fluid to a second assembly.

16 Claims, 4 Drawing Sheets

(51) Int. Cl.
    *F01C 21/10*     (2006.01)
    *F04C 13/00*     (2006.01)
    *B01D 35/26*     (2006.01)
    *F04B 39/16*     (2006.01)
    *F04D 13/12*     (2006.01)

(52) U.S. Cl.
    CPC ............ *F04C 13/005* (2013.01); *F04C 15/06* (2013.01); *F04D 13/12* (2013.01); *Y10T 137/8085* (2015.04); *Y10T 137/85978* (2015.04)

(58) Field of Classification Search
    CPC .......... F04B 53/16; F04B 53/20; F04B 39/16; B01D 35/26; Y10T 137/85978; Y10T 137/8085
    See application file for complete search history.

(56) References Cited

U.S. PATENT DOCUMENTS

2014/0199199 A1*   7/2014   Meinig
2019/0226483 A1*   7/2019   Schnurr ................ F04C 29/025

FOREIGN PATENT DOCUMENTS

| | | |
|---|---|---|
| GB | 2130110 A | 5/1984 |
| JP | 07197881 A | 8/1995 |
| WO | 2013050099 A1 | 4/2013 |

OTHER PUBLICATIONS

German Search Report issued in DE 10 2017 126 750.6 dated Jul. 31, 2018, 8 pages.

\* cited by examiner

PUMP DEVICE

CROSS-REFERENCE TO RELATED APPLICATIONS

This application claims priority to German Patent Application No. 10 2017 126 750.6, filed Nov. 14, 2017, the contents of such application being incorporated by reference herein.

FIELD OF THE INVENTION

The invention relates to a pump device comprising a pump device housing and a delivery chamber which is formed in the pump device housing and/or at least partially by the pump device housing and which comprises an inlet and an outlet. A delivery structure which is arranged in the delivery chamber delivers a fluid from the inlet on a low-pressure side of the pump device to the outlet on a high-pressure side of the pump device. The pump device also comprises a first conduit which channels the fluid from the outlet out of the delivery chamber to a first assembly, and a second conduit which diverges from the first conduit in the region before the first assembly and feeds a portion of the pressurised fluid to a second assembly.

BACKGROUND OF THE INVENTION

Pump devices such as single or tandem pumps are well known. The installation space for such pump devices, in particular when they are attachment parts of an internal combustion engine for a motor vehicle, is generally getting smaller and smaller. In order to be able to simultaneously supply multiple assemblies with the pumped fluid, it is often therefore necessary to install the conduits to the assemblies in a highly contorted manner, which can result in relatively long conduits and the corresponding disadvantages such as for example disruption to the flow due to numerous changes in direction.

SUMMARY OF THE INVENTION

An aspect of the invention is a pump device which enables at least two mutually independent assemblies to be supplied with the pumped fluid, over a short path, while avoiding the disadvantages mentioned.

One aspect of the invention relates to a pump device for a motor vehicle, comprising a pump device housing and a delivery chamber which is formed in the pump device housing and/or at least partially by the pump device housing and which comprises an inlet and an outlet. The pump device also comprises a delivery structure which is arranged in the delivery chamber and delivers a fluid from the inlet on a low-pressure side of the pump device to the outlet on a high-pressure side of the pump device. The pump device also comprises a first conduit which channels the fluid from the outlet out of the delivery chamber to a first assembly, and a second conduit which diverges from the first conduit in a region before the first assembly and feeds a portion of the pressurised fluid to a second assembly. The first assembly and second assembly are preferably different assemblies. An assembly can for example be a filter, a pump, an engine or the like. The fluid delivered in the delivery chamber is preferably a liquid, in particular an oil.

Within the meaning of the application, a conduit is regarded as being a transport path for the fluid, which is produced especially for said transport or introduced into the pump housing or at least partially formed in part by the pump housing in order to transport the fluid. Leaks of any kind, whether intentional or unintentional, are not conduits within the meaning of this application. The second conduit generally exhibits a diameter which is smaller than the diameter of the first conduit, such that a main flow of the fluid is channeled through the first conduit to the first assembly.

The second conduit can diverge from the first conduit at any angle, for example at an angle of 30°, 60°, 90° or any other angle. The second conduit preferably diverges from the first conduit at an angle which is directed substantially transverse to the flow direction of the fluid in the first conduit. If the second conduit diverges at a straight portion of the first conduit, then the angle of bifurcation can be substantially 90°.

The first assembly can for example be a filter which cleans the fluid, fed from the outlet via the first conduit, of solid constituents or particles, for example pollutants, by filtering it. The fluid can for example be an oil, in particular a lubricating oil, without aspects of the invention being restricted to said fluid, since the principle of aspects of the invention can also be advantageously used with other liquids which are to be pumped and which comprise contaminants.

In the region or at the point where the second conduit diverges from the first conduit, a filter element can be arranged which prevents the fluid from passing from the first conduit into the second conduit without being filtered. The filter element can exhibit an identical or similar filter mesh to the filter to which the first conduit feeds the fluid. The filter element can however also exhibit a coarser filter mesh than the filter, i.e. the filter element filters out large particles from the fluid, but allows smaller particles, which the filter in the first conduit would also filter out, to flow into the second conduit.

The filter element is preferably arranged so as to be self-cleaning. The filter element is preferably arranged in the first conduit and/or second conduit such that the particles which are prevented by the filter element from flowing into the second conduit are flushed away from the filter element by the fluid flowing in the first conduit and are carried off towards the first assembly. If, as described above, the first assembly is a filter, then the particles carried off are removed from the fluid at the first assembly by being filtered.

The filter element can comprise a filter surface which is arranged parallel to the flow direction of the fluid in the first conduit. The filter surface can form a permeable wall of the first conduit. The filter element preferably comprises a filter surface which is arranged transverse to the flow direction of the fluid in the second conduit. The filter element can be arranged such that the fluid in the first conduit flows at least partially around the filter element and/or the filter surface. The filter element and/or the filter surface preferably protrudes at least partially into the first conduit, transverse to the flow direction. The filter element and/or the filter surface preferably protrudes out of the second conduit. It is in principle conceivable for the filter element and/or the filter surface to protrude into the second conduit.

The filter element can be or comprise a lattice, screen or mesh. The lattice, screen or mesh preferably forms the filter surface. The filter element is advantageously formed as a sintered filter. The filter element is preferably formed, as a filter, from a sintered metal, i.e. in particular manufactured from a metal powder, for example bronze, by means of a sintering method. Different particle sizes and wall thicknesses of the filters enable the ability of fluid to flow through and the filter properties to be adjusted exactly. The filter element can be disc-shaped or cup-shaped or can exhibit a different shape such as for example a cylindrical, truncated conical or funnel-shaped basic shape.

In the region of or at the bifurcation, the filter element can be fixed or connected in the first conduit and/or second conduit, or on a side of the second conduit which faces towards the first conduit, in a positive fit, force fit and/or material fit, for example by being elastically latched in, pressed in, glued, soldered, fused, etc. Any suitable type of connection can in principle be chosen by the person skilled in the art. The filter element can be detachably connected to the first conduit and/or second conduit, such that it can be replaced, for example when the pump device is being serviced or repaired, without damaging the pump device in the process.

The filter element can also be produced as a lattice or screen by providing the first conduit with numerous small openings, which act as a filter element, in its circumferential wall in the region where the second conduit diverges. These small and minimal openings can for example be introduced into the first conduit or into the circumferential wall of the first conduit using a laser. The surface comprising the openings is smaller than an effective diameter of the second conduit, and all the openings feed completely into the second conduit once the latter has been connected to the first conduit.

The first conduit can comprise the outlet out of the delivery chamber, and the bifurcation can be formed in or near to the outlet. The bifurcation preferably lies with a portion of the first conduit and a portion of the second conduit within the pump device housing, and the pump device housing preferably forms at least a part of the bifurcation and/or first conduit and/or second conduit. The pump device housing can comprise a pump device housing cover which forms or at least partially forms part of the bifurcation and/or a portion of the first conduit and/or a portion of the second conduit.

The pump device can be an oil pump, such as for example a rotary pump, and the first assembly can be an oil filter. The pump device, in particular the oil pump, can itself form the second assembly, wherein the second conduit guides the fluid to for example at least one lubricating location of the pump device, in particular the oil pump.

The pump device can however also be a tandem pump which preferably comprises a lubricating pump and a vacuum pump. In the case of a tandem pump, the lubricating pump and/or the vacuum pump can form the second assembly which is supplied with the pumped fluid by the second conduit.

The second conduit can form or comprise a first feed conduit and at least a second feed conduit after the filter element, which feed the pumped fluid to the second assembly and possibly a third assembly or provide the pumped fluid to the second assembly at different locations for different purposes. Thus, if the second assembly is the vacuum pump, the first feed conduit can supply a delivery chamber of the vacuum pump with a lubricating fluid, and the second feed conduit can feed the same fluid, which is used as a lubricating fluid, to for example a sealing groove in order to serve as a sealing fluid.

The first conduit can for example channel lubricant to an internal combustion engine of a vehicle, preferably an internal combustion engine of a motor vehicle. The first conduit can likewise be sub-divided into two or more feed conduits after the first assembly, for example the filter, in order to simultaneously supply more than one assembly with the lubricating fluid or to simultaneously supply one assembly with the lubricating fluid at multiple locations. The vacuum pump preferably supplies a brake servo of the motor vehicle with a negative pressure.

BRIEF DESCRIPTION OF THE DRAWINGS

In the following, an example embodiment of aspects of the invention is explained in more detail on the basis of figures. Features essential to aspects of the invention which can only be gathered from the figures form part of the scope of aspects of the invention and can advantageously develop the subject-matter of claim 1, alone or in combination with other features.

The figures individually show.

DETAILED DESCRIPTION OF THE INVENTION

Figure 1:
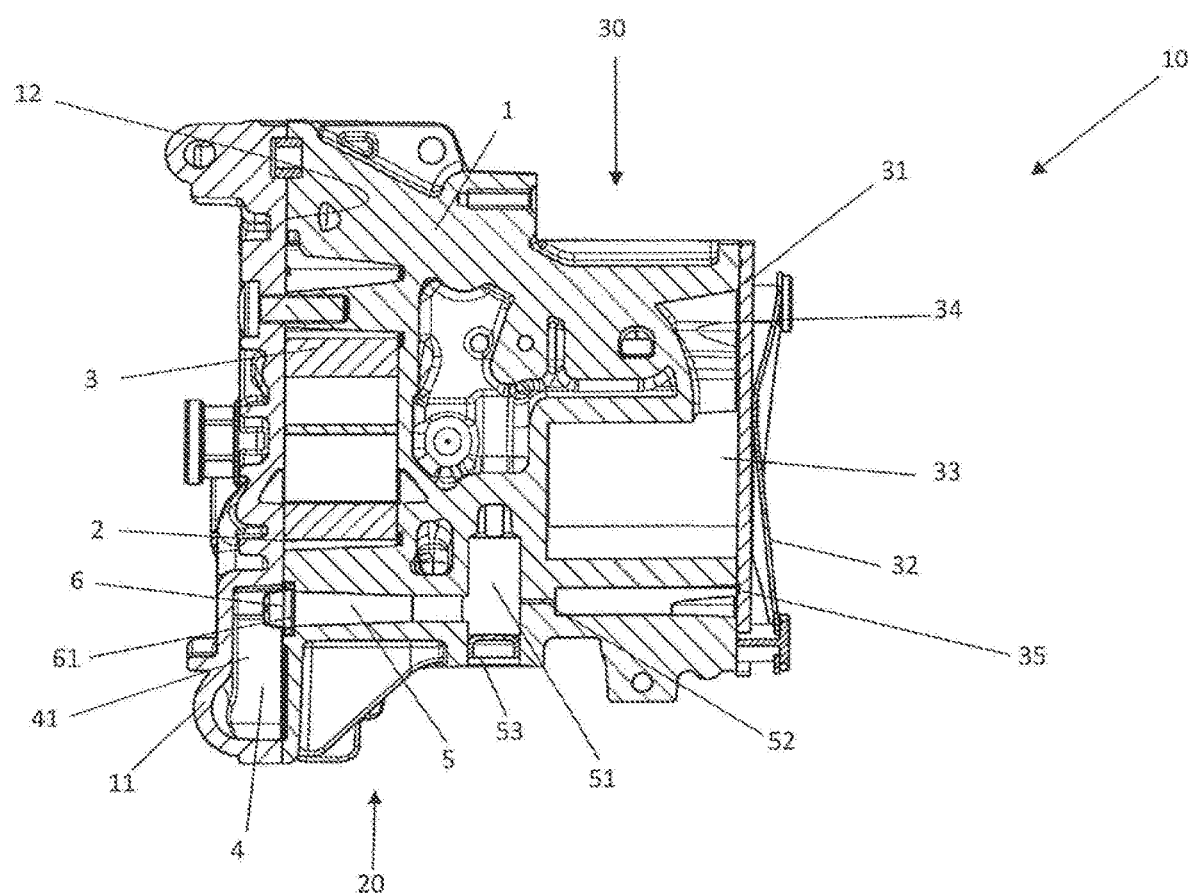
FIG. 1 a plan view of a pump device in a longitudinal section.

FIG. 1 shows a plan view of a section parallel to an axis of rotation (not shown) of a pump device 10 in accordance with an aspect of the invention. The pump device 10 is a tandem pump. The pump device 10 comprises a delivery pump 20 and a vacuum pump 30. The pump device 10 also comprises a pump device housing 1, 11, 31 comprising a common housing 1 for the delivery pump 20 and the vacuum pump 30, a housing cover 11 for the delivery pump 20 and a housing cover 31 for the vacuum pump 30. The delivery pump 20 and the vacuum pump 30 are driven via a common drive shaft. The drive shaft is formed in one part. The delivery pump 20 comprises a delivery chamber 2 and the housing cover 11 which seals the delivery chamber 2 on an end face 12 of the housing 1 which faces away from the vacuum pump 30. A delivery structure 3, for example a rotor, which is mounted in the delivery chamber 2 rotates about an axis of rotation and thereby delivers a fluid from an inlet into the delivery chamber 2 (not shown) to an outlet out of the delivery chamber 2, simultaneously increasing a pressure of the fluid. The delivery pump 20 is formed as a lubricating oil pump which supplies an internal combustion engine of a motor vehicle with lubricating oil.

The outlet forms a part of a first conduit 4 which channels a first portion or partial flow of the pressurised fluid from the outlet to a first assembly (not shown). The first assembly is arranged before the internal combustion engine in terms of flow dynamics. The first assembly is a filter which cleans the fluid fed from the outlet via the first conduit 4 by filtering it. A second conduit 5 diverges from the first conduit 4 at a bifurcation 41 which is before the first assembly in terms of flow dynamics, wherein the second conduit 5 channels a second portion or partial flow of the pressurised fluid to a second assembly which in the example embodiment shown is the vacuum pump 30.

A filter element 6 is arranged at the point 41 where the second conduit 5 diverges from the first conduit 4, wherein the fluid which flows into the second conduit 5 must flow through the filter element, wherein the fluid channeled into the second conduit 5 is filtered, and the particles which are filtered out become caught on or in the filter element 6. The filter element 6 can be self-cleaning. It is arranged so as to be self-cleaning, i.e. the particles held back by the filter element 6 are carried off, by the fluid flow in the first conduit 4, towards the first assembly or filter, where they are filtered out of the fluid. The filter mesh of the filter element 6 and the filter mesh of the filter can be the same, almost the same, or different, wherein if they are different, the filter preferably exhibits a higher filter mesh than the filter element 6.

The filter element 6 shown in the example embodiment is connected to the second conduit 5 via a collar 61. The collar 61 can be part of the second conduit 5 or part of the filter element 6 or can be a separate part. If it is a separate part, then said part can be connected to the second conduit 5 and/or the first conduit 4 and can accommodate the filter element 6.

The first conduit 4 is formed by the common housing 1 and the housing cover 11 of the delivery pump 20. The second conduit 5 is formed by the common housing 1. The end face 12 of the second conduit 5 comprises an opening which forms the bifurcation 41. The opening of the second conduit 5 is connected to the first conduit 4 which is formed by the housing cover 11 of the delivery pump 20. The opening of the second conduit 5 is sealed with respect to the environment by the housing cover 11 of the delivery pump 20 or by the first conduit 4 which is formed by the housing cover 11 of the delivery pump 20. The filter element 6 is arranged at the end-facing opening of the second conduit 5. The filter element 6 protrudes out from the end face 12. It protrudes into the first conduit 4 which is formed by the housing cover 11 of the delivery pump 20. The filter element 6 protrudes out of the opening of the second conduit 5.

The filter element 6 is arranged within the pump device housing 1, 11, 31. The filter element 6 is connected to the common housing 1. It protrudes out of the common housing 1 on the end-facing side. The housing cover 11 of the delivery pump 20 covers the filter element 6.

In the pump device 10 of the example embodiment, the second conduit 5 is divided into a first feed conduit 51 and a second feed conduit 52. The first feed conduit 51 can for example be connected to a delivery chamber 33 of the vacuum pump 30 and can channel the fluid, as a lubricant and sealant, into the delivery chamber 33. In the example embodiment, the second feed conduit 52 is connected to a sealing groove 35 of the vacuum pump 30. The sealing groove 35 can for example be formed on an end face 34 of the housing 1 which faces away from the delivery pump 20 and towards an inner side of the housing cover 31 of the vacuum pump 30. The hydraulic sealing groove 35 at least partially surrounds the delivery chamber 33 of the vacuum pump 30 and is formed between the housing 1 and the housing cover 31. The sealing groove 35 hydraulically seals the delivery chamber 33 of the vacuum pump 30 off from the environment of the vacuum pump 30. In the example embodiment, the housing cover 31 of the vacuum pump 30 is pressed against the end face 34 of the delivery chamber 33 of the vacuum pump 30 by means of a spring element 32. When there is a positive pressure within the delivery chamber 33, the housing cover 31 can be lifted off the end face 34, at least in a circumferential portion, against the spring force and thus form a relieving gap through which fluid can be outputted from the delivery chamber 33 to the environment, bypassing the outlet.

Figure 2:
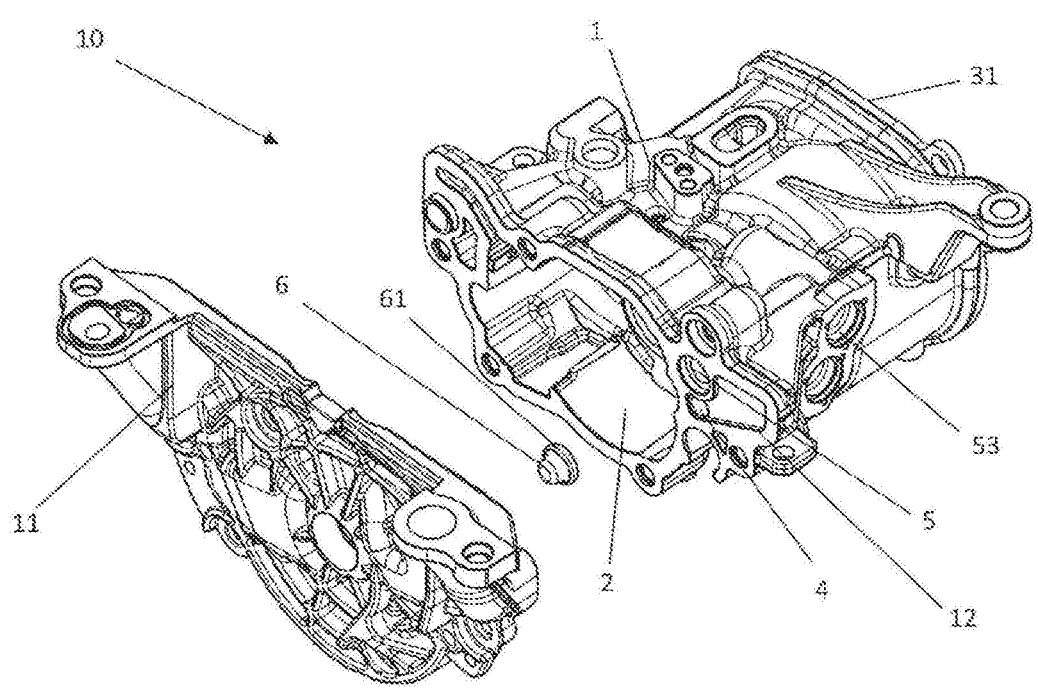
FIG. 2 the pump device of FIG. 1 in an exploded representation.

FIG. 2 shows the pump device 10 of FIG. 1, wherein the housing cover 11 has been removed from the housing 1 such that it is possible to see into the delivery chamber 2. The delivery structure 3 is not shown in FIG. 2.

The outlet out of the delivery chamber 2 is formed in the housing cover 11 and cannot be seen. The first conduit 4, the second conduit 5 and the filter element 6 are visible. In this embodiment, the filter element 6 comprises the collar 61 via which the filter element 6 can be inserted into the second conduit 5, such that the fluid can only flow out of the first conduit 4 into the second conduit 5 through the filter element 6. The collar 61 can be a sealing ring, made for example of an elastic material, ceramics or a special plastic, which can withstand the conditions which prevail at the point 41 where the second conduit 5 diverges from the first conduit 4, such as for example heat, pressure and chemically aggressive fluid, over a long period.

Figure 3:
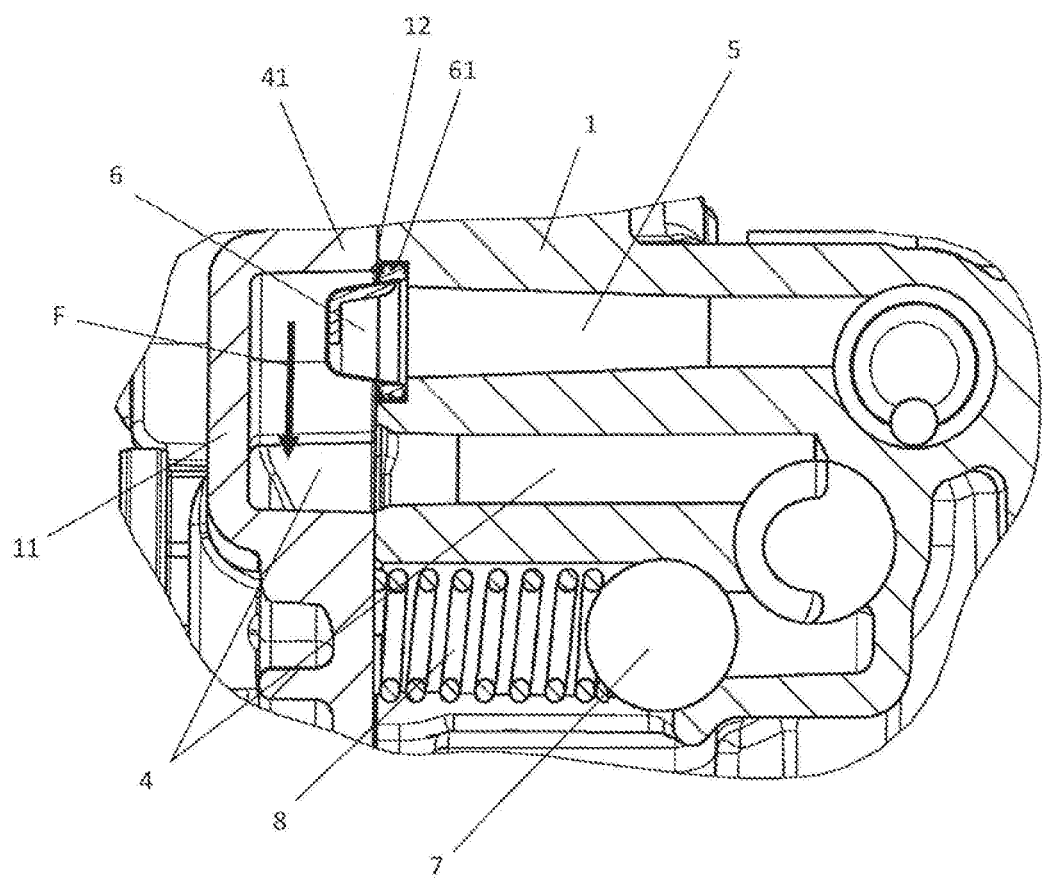
FIG. 3 a detail of a longitudinal section of the pump device in a lateral view.

FIG. 3 shows a detail of a lateral view of a section parallel to the axis of rotation of the pump device 10. A sectional plane of FIG. 1 and a sectional plane of FIG. 3 are arranged perpendicular with respect to each other. FIG. 3 shows the pump device 10, comprising: the first conduit 4; a reflux valve 7 which is biased into a closed position by a spring element 8; the second conduit 5; and the filter element 6. At high pressures, the reflux valve 7 opens the first conduit 4 into the environment of the pump device 10, for example during a cold start. A volume of the partial flow which is channeled into the second conduit 5 can be at least approximately defined by the size of the filter element 6. The filter element 6 can in principle comprise filtering openings only on its side pointing counter to a flow direction F of the fluid, while the side pointing in the flow direction is closed, thus enabling a partial flow of the fluid to be forced to be redirected from the first conduit 4 to the second conduit 5.

Figure 4:
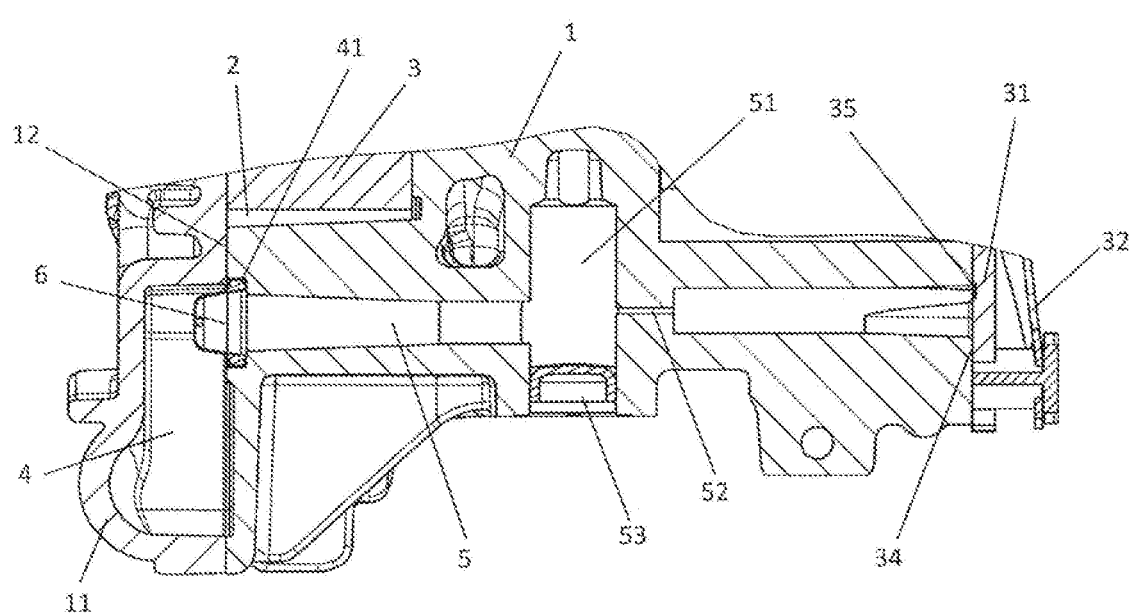
FIG. 4 a detail of the longitudinal section of the pump device from FIG. 1.

FIG. 4 shows a detail of FIG. 1 which has already been described in detail with respect to FIG. 1. The second conduit 5 is sub-divided into a first feed conduit 51 and a second feed conduit 52. The filter element 6 is arranged such that fluid can only flow out of the outlet or, respectively, the first conduit 4 into the second conduit 5 through the filter element 6. Where it diverges 41 from the first conduit 4, the second conduit 5 is arranged transverse to the first conduit 4, i.e. the fluid is deflected transverse to the flow direction F which extends perpendicular to the plane of the drawing in FIG. 4. The second conduit 5 or, respectively, the first feed conduit 51 is introduced into the housing 1 of the pump device 10 as a drilled hole and sealed airtight by a sealing cap 53.

LIST OF REFERENCE SIGNS 1 housing
10 pump device
11 housing cover
12 end face
2 delivery chamber
20 delivery pump
3 delivery structure
30 vacuum pump
31 housing cover
32 spring element
33 delivery chamber
34 end face
35 sealing groove
4 first conduit
41 bifurcation
5 second conduit
51 first feed conduit
52 second feed conduit
53 sealing cap
6 filter element
61 collar
7 reflux valve
8 spring element
F flow direction

The invention claimed is:

1. A pump device for a motor vehicle, comprising:
a pump device housing;
a delivery chamber which is formed in the pump device housing and/or at least partially by the pump device housing and which comprises an inlet and an outlet;
a delivery structure which is arranged in the delivery chamber and delivers a fluid from the inlet on a low-pressure side of the pump device to the outlet on a high-pressure side of the pump device; and
a first conduit which channels the fluid from the outlet out of the delivery chamber to a first assembly;
wherein a second conduit diverges from the first conduit in the region before the first assembly and feeds a portion of the pressurised fluid to a second assembly, and
wherein a filter element is arranged at a point where the second conduit diverges from the first conduit.

2. The pump device according to claim 1, wherein the first assembly is a filter which cleans the fluid, fed from the outlet via the first conduit, by filtering it.

3. The pump device according to claim 1, wherein the filter element is or comprises a lattice, screen or mesh or is formed as a lattice or screen.

4. The pump device according to claim 1, wherein the first conduit comprises the outlet out of the delivery chamber, and a bifurcation is formed in or near to the outlet.

5. The pump device according to claim 4, wherein the bifurcation lies with a portion of the first conduit (4) and a portion of the second conduit within the pump device housing, and the pump device housing forms at least a part of the bifurcation and/or first conduit and/or second conduit.

6. The pump device according to claim 1, wherein the pump device is a tandem pump which comprises a liquid pump and a gas pump.

7. The pump device according to claim 6, wherein the liquid pump supplies the first conduit and the second conduit with the fluid.

8. The pump device according to claim 7, wherein the liquid pump is a lubricating pump, and the gas pump is a vacuum pump.

9. The pump device according to claim 6, wherein the liquid pump is a lubricating pump, and the gas pump is a vacuum pump.

10. The pump device according to claim 6, wherein the second conduit supplies the liquid pump and/or the gas pump with a lubricant and/or sealant via a feed conduit.

11. The pump device according to claim 6, wherein the second conduit supplies a sealing groove of the gas pump with a sealant via a feed conduit.

12. The pump device according to claim 1, wherein the second assembly is a gas pump.

13. The pump device according to claim 1, wherein the second assembly is a vacuum pump.

14. A pump device for a motor vehicle, comprising:
a pump device housing;
a delivery chamber which is formed in the pump device housing and/or at least partially by the pump device housing and which comprises an inlet and an outlet;
a delivery structure which is arranged in the delivery chamber and delivers a fluid from the inlet on a low-pressure side of the pump device to the outlet on a high-pressure side of the pump device; and
a first conduit which channels the fluid from the outlet out of the delivery chamber to a first assembly;
wherein a second conduit diverges from the first conduit in the region before the first assembly and feeds a portion of the pressurised fluid to a second assembly,
wherein a filter element is arranged in a region or at a point where the second conduit diverges from the first conduit, and
wherein the filter element protrudes at least partially into the first conduit.

15. A pump device for a motor vehicle, comprising:
a pump device housing;
a delivery chamber which is formed in the pump device housing and/or at least partially by the pump device housing and which comprises an inlet and an outlet;
a delivery structure which is arranged in the delivery chamber and delivers a fluid from the inlet on a low-pressure side of the pump device to the outlet on a high-pressure side of the pump device; and
a first conduit which channels the fluid from the outlet out of the delivery chamber to a first assembly;
wherein a second conduit diverges from the first conduit in the region before the first assembly and feeds a portion of the pressurised fluid to a second assembly,
wherein a filter element is arranged in a region or at a point where the second conduit diverges from the first conduit, and
wherein the filter element arranged so as to be self-cleaning, such that pollutants in the fluid which are prevented by the filter element from flowing into the second conduit are flushed away from the filter element by the fluid in the first conduit and are carried off towards the first assembly.

16. A pump device for a motor vehicle, comprising:
a pump device housing;
a delivery chamber which is formed in the pump device housing and/or at least partially by the pump device housing and which comprises an inlet and an outlet;
a delivery structure which is arranged in the delivery chamber and delivers a fluid from the inlet on a low-pressure side of the pump device to the outlet on a high-pressure side of the pump device; and
a first conduit which channels the fluid from the outlet out of the delivery chamber to a first assembly;
wherein a second conduit diverges from the first conduit in the region before the first assembly and feeds a portion of the pressurised fluid to a second assembly,
wherein the first assembly is a filter which cleans the fluid, fed from the outlet via the first conduit, by filtering it, and
wherein a filter element is arranged in the region or at a point where the second conduit diverges from the first conduit.

* * * * *